(No Model.)

P. G. METZLER & R. S. DAVIS.
LIQUID BLACKING BOX.

No. 409,415. Patented Aug. 20, 1889.

WITNESSES:
F. McArdle
C. Sedgwick

INVENTOR:
P. G. Metzler
BY R. S. Davis
Munn & Co
ATTORNEYS.

UNITED STATES PATENT OFFICE.

PAUL G. METZLER AND RODERIC S. DAVIS, OF LEADVILLE, COLORADO.

LIQUID-BLACKING BOX.

SPECIFICATION forming part of Letters Patent No. 409,415, dated August 20, 1889.

Application filed January 4, 1889. Serial No. 295,425. (No model.)

*To all whom it may concern:*

Be it known that we, PAUL G. METZLER and RODERIC S. DAVIS, both of Leadville, in the county of Lake and State of Colorado, have invented a new and useful Improvement in Liquid-Blacking Boxes, of which the following is a full, clear, and exact description.

The object of the invention is to provide a box for containing liquid blacking, which box may be readily applied to the ordinary dauber commonly sold on the market, either by the manufacturer or the purchaser thereof.

The invention will be first described, and then specifically pointed out in the claims.

Reference is to be had to the accompanying drawings, forming a part of this specification, in which similar figures of reference indicate corresponding parts in all the views.

Figure 1:
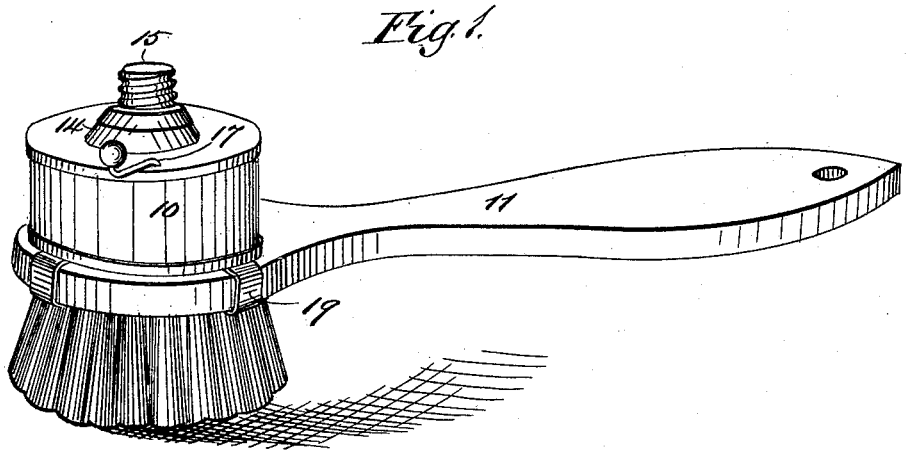
Figure 2:
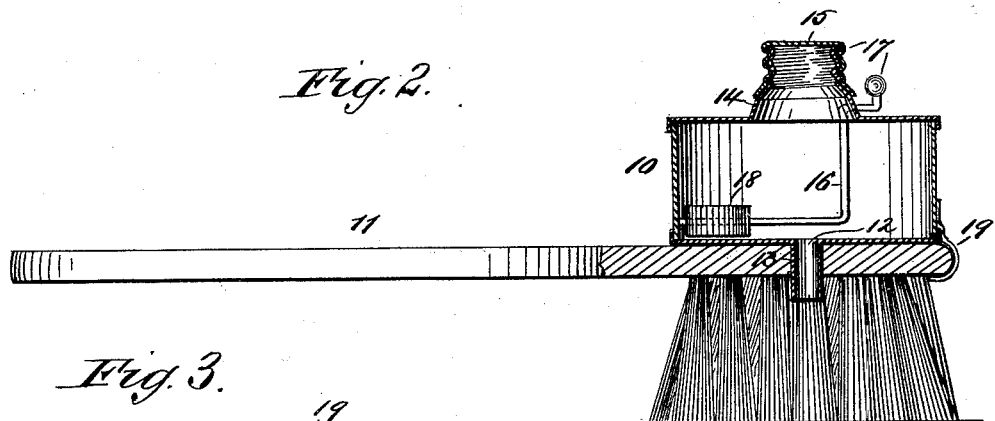
Figure 3:
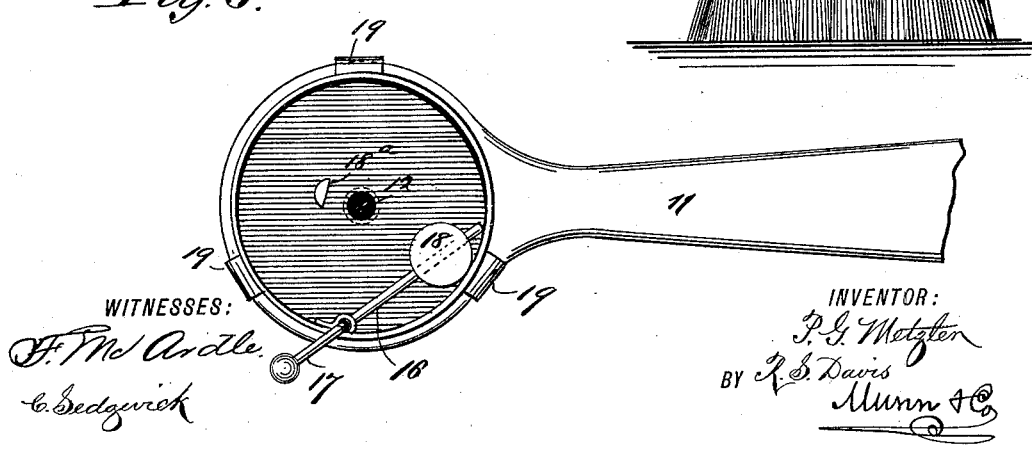

Figure 1 is a perspective view of the receptacle illustrated as applied to the dauber. Fig. 2 is a central vertical section through the receptacle, and also through the head of the dauber; and Fig. 3 is a plan view of the receptacle attached to the dauber, the top of the former being removed.

The receptacle 10, which may be constructed of tin, copper, brass, or other metal, may be made of any size or contour, but is preferably constructed to conform to the shape and size of the head of the dauber 11, in connection with which it is to be employed. The top and bottom of the receptacle are rigidly attached to the body, and the body is provided, preferably at the center, with an outlet-aperture 12, in which aperture a tube 13 is inserted, adapted to project perpendicularly downward any suitable distance.

In the top of the receptacle an inlet-opening is produced surrounded by an upwardly-extending exteriorly-threaded collar 14, which collar is provided with a threaded cover 15. Within the receptacle at one side an angled lever-arm 16 is journaled, the upper or vertical member of which lever-arm is carried upward through a suitable aperture in the top of the receptacle, and the outer extremity of said member is preferably bent or shaped to provide a crank-handle 17. The horizontal member of the angled lever-arm 16 extends over the bottom of the receptacle beyond the center, and to the extremity of the said horizontal member a valve 18 is secured, preferably consisting of a cork disk. The said disk is so mounted upon the lever-arm 16 that when the handle 17 is carried in one direction the disk will be made to cover the outlet-opening 12, a stop $18^a$ being formed upon the bottom of the receptacle to that end at one side of the outlet 12, as best shown in Fig. 3. Thus when the handle is manipulated to carry the disk over the outlet the side of the disk is brought in contact with the stop, which stop is so located that when engaged by the disk the latter will completely cover the said opening.

Wings 19 are attached to the sides of the receptacle, at the base or to the base itself, as may in practice be preferred, which wings are adapted to secure the receptacle to the dauber.

In attaching the device to the dauber the tube 13 is inserted in a hole made in the head of the former, extending, preferably, through the same at the center, and the wings are then bent downward over the edge of the body to clamp the same, as best illustrated in Figs. 1 and 2.

By unscrewing the small cover 15 the receptacle may be filled with liquid blacking—such as is used for either ladies' or gents' shoes—and by manipulating the lever in one direction—for instance, with the index-finger—the outlet or valve opening is uncovered and the blacking is permitted to ooze out through the tube 13 upon the bristles and then upon the shoe. When sufficient blacking has passed from the receptacle, the lever 16 is carried in an opposite direction, the outlet-opening 12 is closed, and the flow of blacking ceases.

It will be observed that in the manipulation of the device the hands of the operator need not be soiled in the slightest degree, and that the constant use of saliva upon the dauber, as is now necessary, is dispensed with.

The box may be sold separately from the dauber, and any one may apply it to a dauber by simply boring a hole through the head thereof for the outlet-tube, and then inserting the tube and bending the wings around the edges of the head. No special construction of brush is required and no specially-constructed dauber. No springs, riveting, or pivots are required, and hence a very cheap device is afforded.

Having thus described our invention, what we claim as new, and desire to secure by Letters Patent, is—

1. The combination, with an ordinary dauber 11, having its handle and head in one piece and provided with a hole 13 through its head, of a box 10 on top of the head and provided with an outlet-tube 12, entering said hole, flexible clips or wings 19, bent around the edge of the head, and a valve operating over said outlet-tube, substantially as set forth.

2. As an improved article of manufacture, a liquid-blacking box for ordinary daubers, consisting in the box 10, having an outlet-tube 12, a valve therefor provided with an operating-rod extending through the top of the box, and a circularly-arranged series of flexible clips or wings 19, substantially as set forth.

3. As an improved article of manufacture, a liquid-blacking box for ordinary daubers, consisting in the box 10, having a circularly-arranged series of flexible attaching-clips 19, an outlet-tube 12, a crank-shaft 16, extending through the top and provided at its lower end with a horizontal arm having a valve 18 thereon and an operating-handle at its upper end, and a stop 18ª in the bottom of the box to one side of the tube 12, substantially as set forth.

PAUL G. METZLER.
RODERIC S. DAVIS.

Witnesses:
ALONZO WALKER,
JNO. S. MOSLEIGH.